No. 659,173. Patented Oct. 2, 1900.
R. W. KOCH.
ROASTING MACHINE.
(Application filed Mar. 26, 1900.)
(No Model.) 8 Sheets—Sheet 1.

Witnesses
F. H. Schott
Joseph Harper

Inventor
Rudolph W. Koch
by W. H. Ruff
Attorney

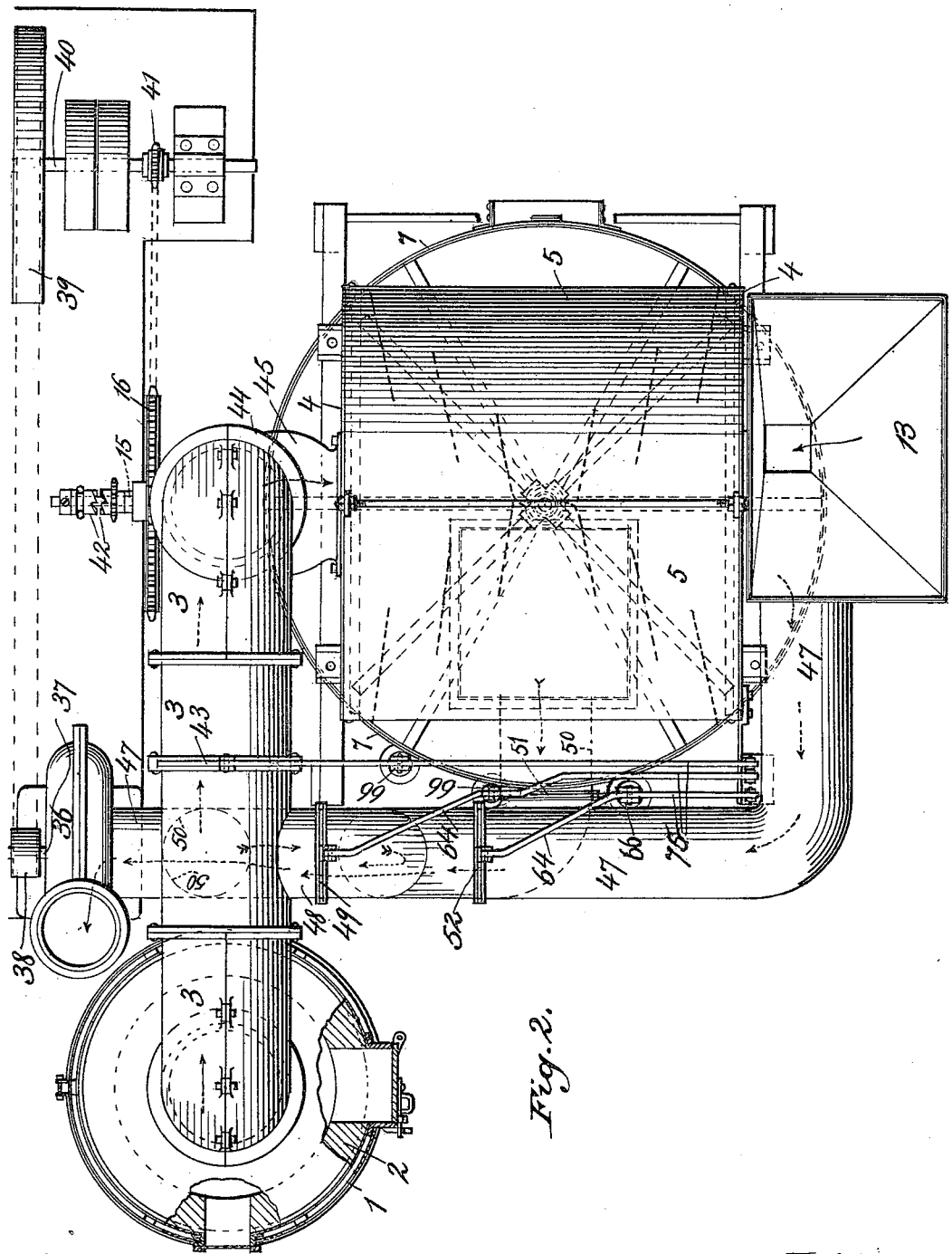

No. 659,173. Patented Oct. 2, 1900.
R. W. KOCH.
ROASTING MACHINE.
(Application filed Mar. 26, 1900.)
(No Model.) 8 Sheets—Sheet 3.
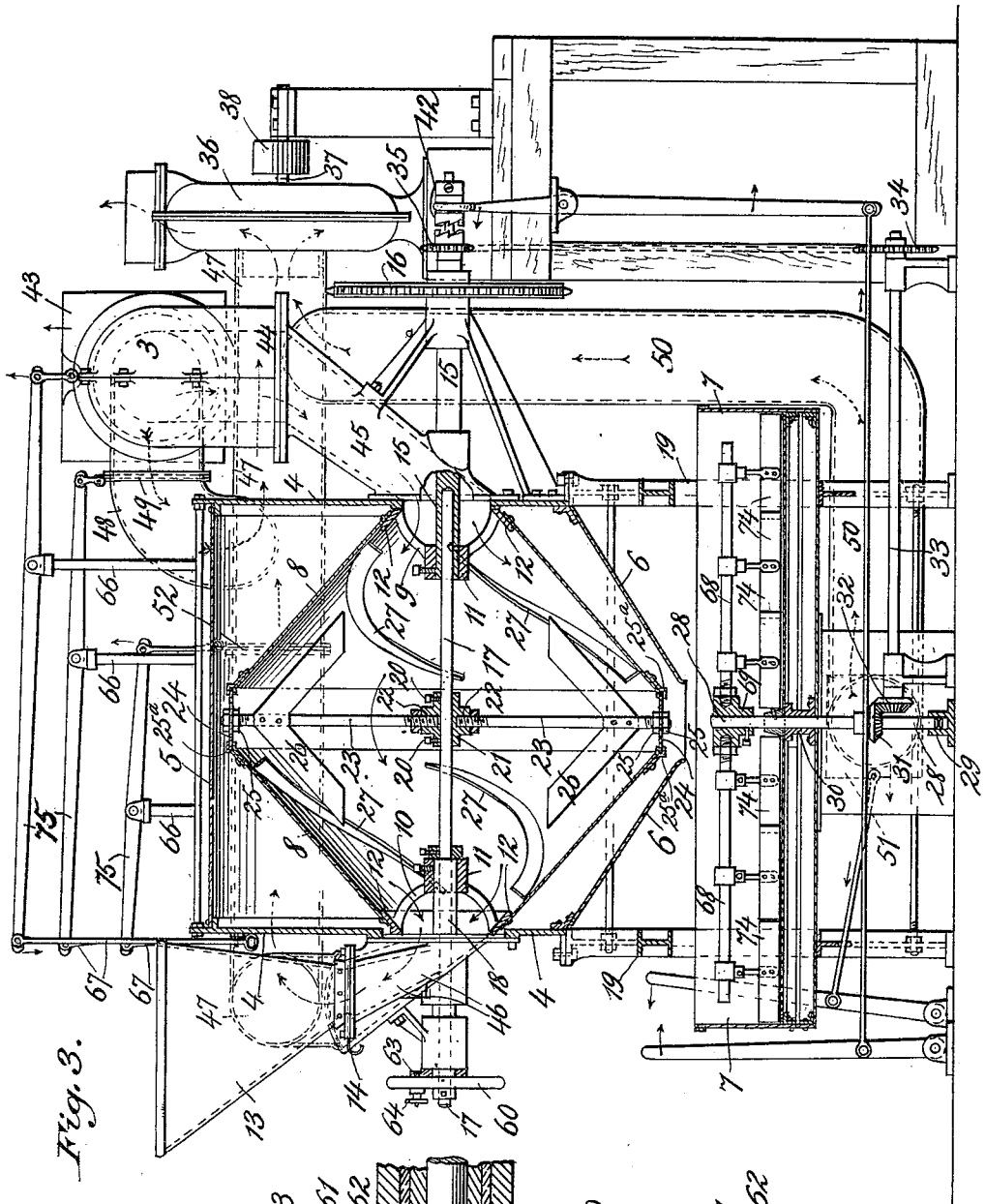
Witnesses
H. H. Schott
Joseph Harper
Inventor
Rudolph W. Koch
By W. H. Ruff
Attorney No. 659,173. Patented Oct. 2, 1900.
R. W. KOCH.
ROASTING MACHINE.
(Application filed Mar. 26, 1900.)
(No Model.) 8 Sheets—Sheet 4.
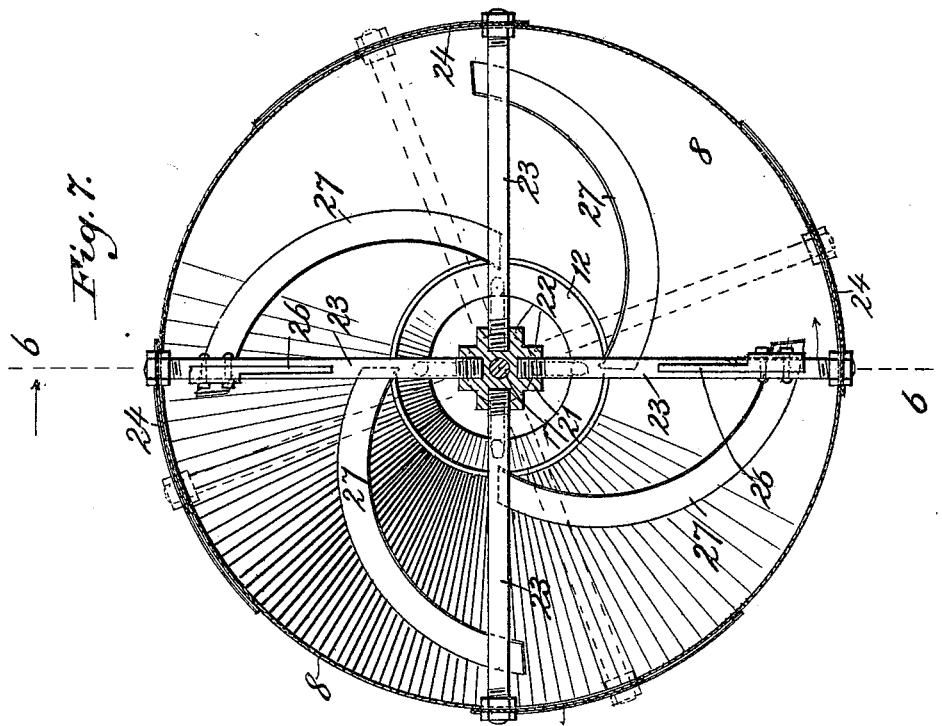
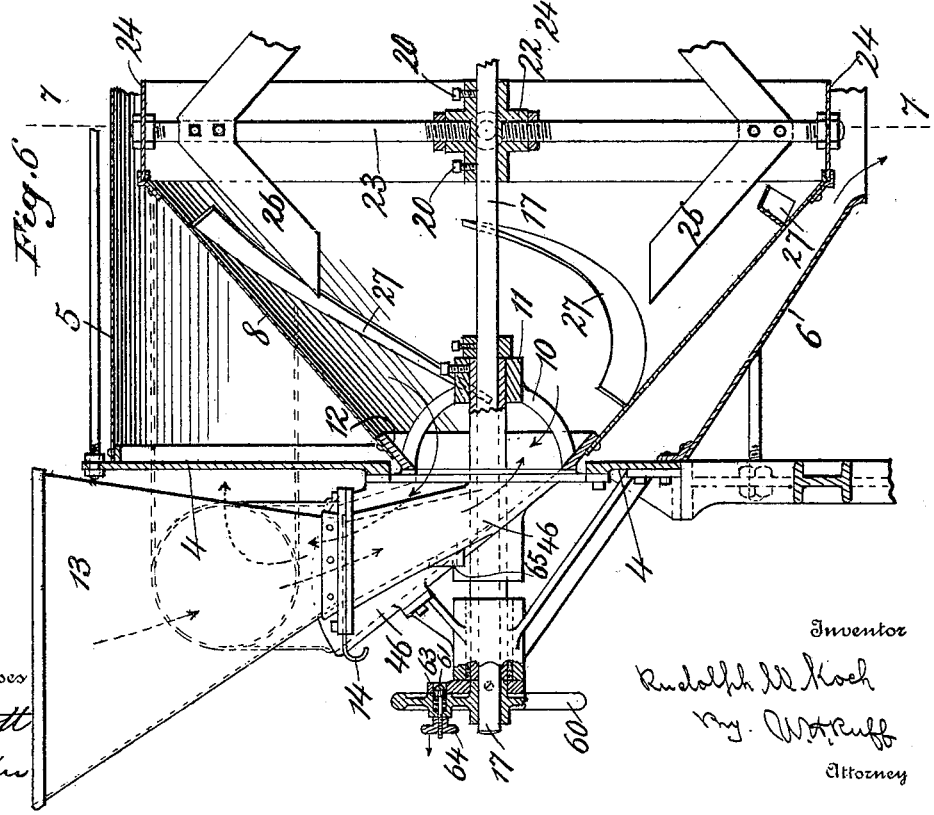

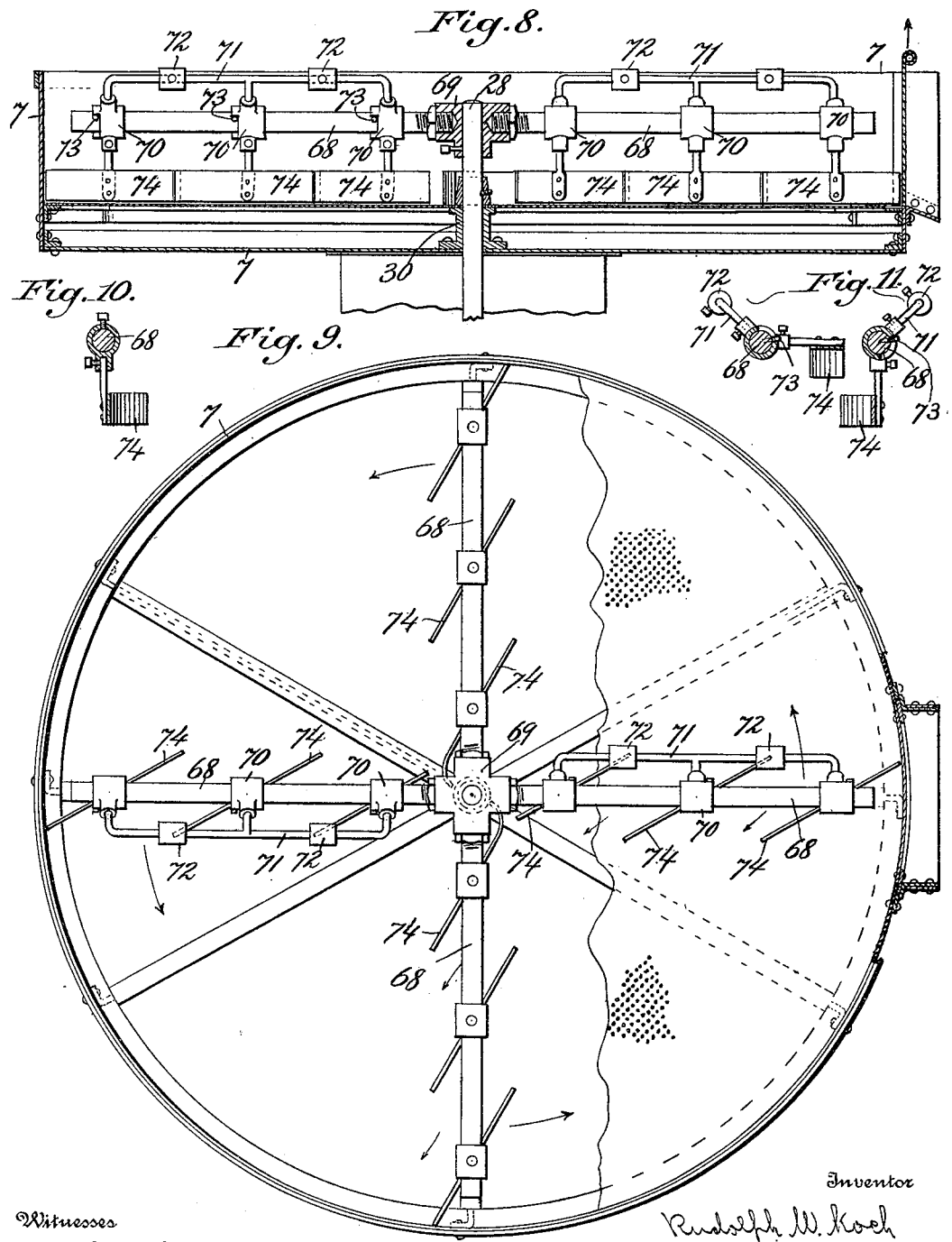

No. 659,173. Patented Oct. 2, 1900.
R. W. KOCH.
ROASTING MACHINE.
(Application filed Mar. 26, 1900.)
(No Model.) 8 Sheets—Sheet 6.
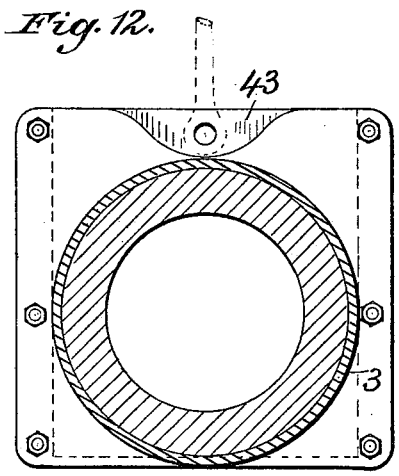
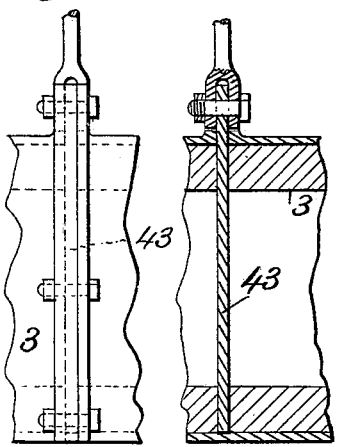
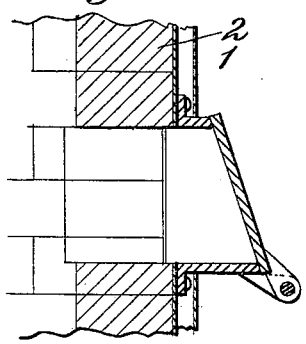
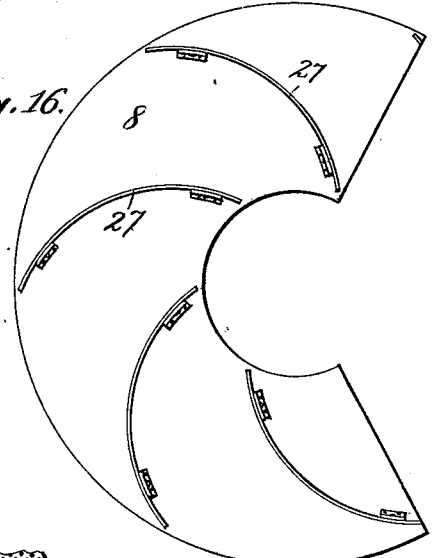
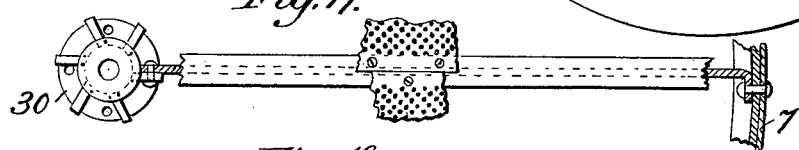
Witnesses
F. H. Schott
Joseph Harper
Inventor
Rudolph W. Koch
By W. H. Ruff
Attorney
THE NORRIS PETERS CO., PHOTO-LITHO., WASHINGTON, D. C.

No. 659,173. Patented Oct. 2, 1900.
R. W. KOCH.
ROASTING MACHINE.
(Application filed Mar. 26, 1900.)
(No Model.) 8 Sheets—Sheet 7.

Witnesses
F. H. Schott
Josef A. Kaefer

Inventor
Rudolph W. Koch
By W. H. Ruff
Attorney

No. 659,173. Patented Oct. 2, 1900.
R. W. KOCH.
ROASTING MACHINE.
(Application filed Mar. 26, 1900.)
(No Model.) 8 Sheets—Sheet 8.
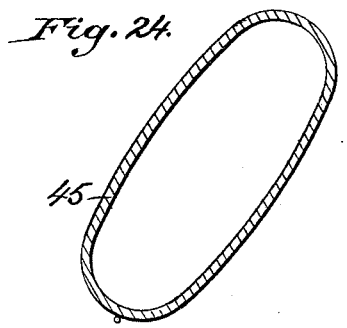
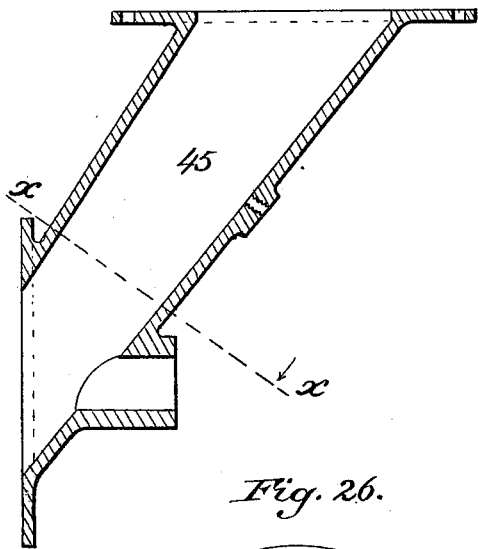
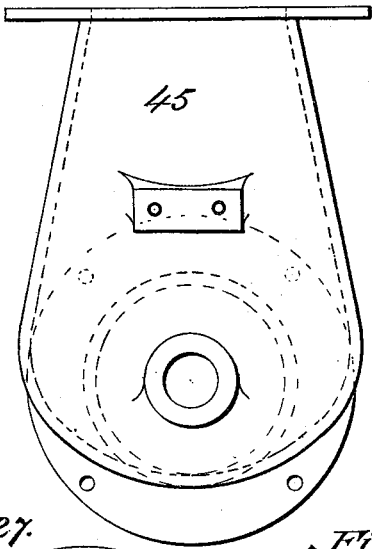
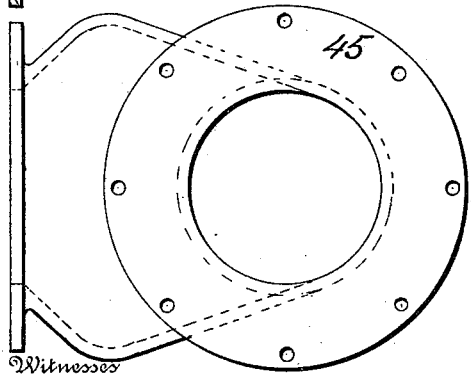
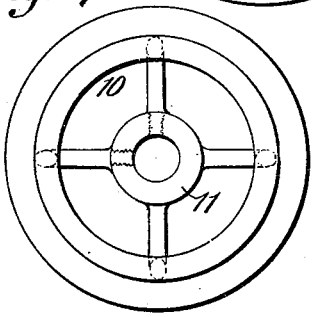
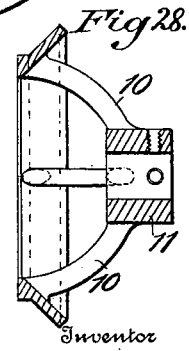

UNITED STATES PATENT OFFICE.

RUDOLPH W. KOCH, OF FRUITVALE, CALIFORNIA.

ROASTING-MACHINE.

SPECIFICATION forming part of Letters Patent No. 659,173, dated October 2, 1900.

Application filed March 26, 1900. Serial No. 10,214. (No model.)

*To all whom it may concern:*

Be it known that I, RUDOLPH W. KOCH, a citizen of the United States, residing at Fruitvale, in the county of Alameda and State of California, have invented certain new and useful Improvements in Roasting-Machines, of which the following is a specification.

My invention relates to machines for roasting coffee or other materials, the object being to effect a thorough roasting of the material in the minimum time and to preserve the essence or flavor of the coffee or other material being roasted.

To these ends my invention consists in the features and in the novel construction, combination, and arrangement of parts hereinafter fully described, and particularly pointed out in the claims following the description.

Figure 1:
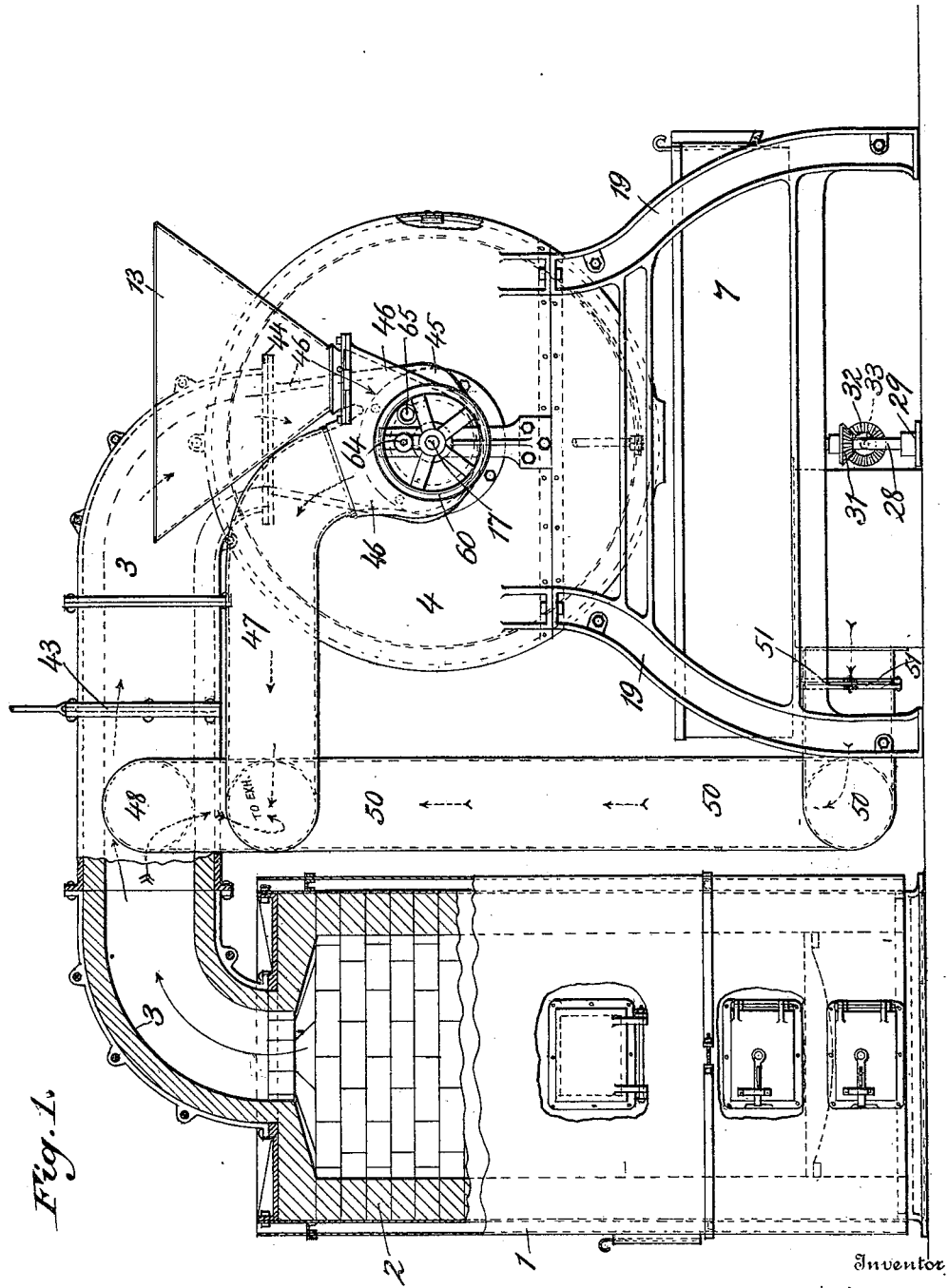
Figure 19:
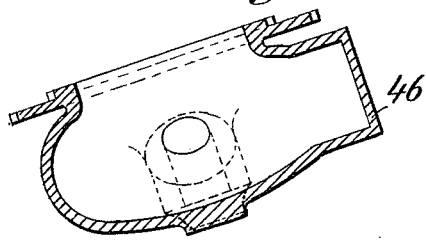
Figure 20:
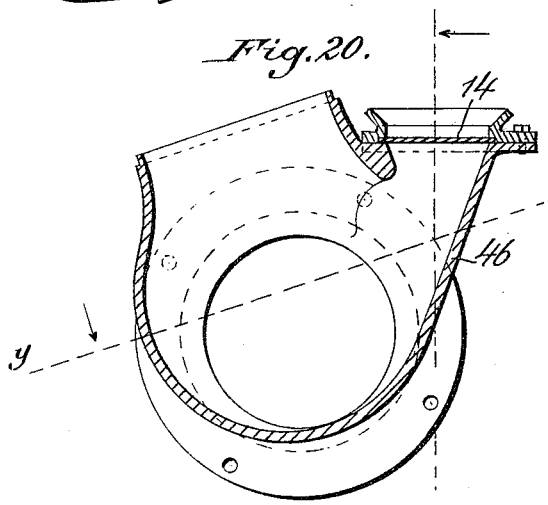
Figure 21:
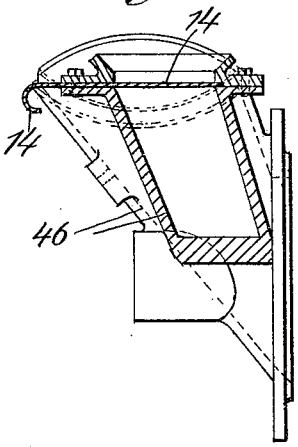
Figure 22:
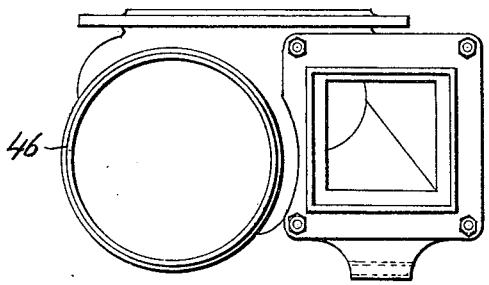

In the accompanying drawings, which form a part of this specification, Figure 1 is a front elevation, partly in section, of a furnace and an end elevation of a roaster embodying the invention. Fig. 2 is a top plan view of the same. Fig. 3 is a vertical section of the roaster and cooling apparatus. Fig. 4 is an enlarged detail section of the hand-wheel and devices connected therewith for controlling the discharge of the coffee from the drum. Fig. 5 is a detail section of a portion of the wheel shown in Fig. 4, with the parts in a different position from that shown in Fig. 4. Fig. 6 is an enlarged vertical section of the front portion of the drum and hopper. Fig. 7 is a section on the line 7 7 of Fig. 6, showing the discharge-gates of the drum and the vanes for deflecting the coffee toward the front of the drum. Fig. 8 is a central vertical section of the cooler. Fig. 9 is a plan view, partly in section, of the cooler. Figs. 10 and 11 are detail section views showing the different positions of the stirring-blades within the cooler. Figs. 12, 13, and 14 are detail views of one of the gate-valves employed for controlling the circulation of hot air. Fig. 15 is a detail sectional view of the furnace-wall, showing one of its doors. Fig. 16 is a development of one of the conical ends of the drum. Figs. 17 and 18 are detail sectional views of the cooler; and Figs. 19 to 22, inclusive, are detail views of the hopper-casting of the heating-drum.

Fig. 23 is a vertical section of the casting which connects the furnace-flue to the drum. Fig. 24 is a section on the line $x$ $x$ of Fig. 23. Fig. 25 is an elevation, and Fig. 26 a plan of Fig. 23; and Figs. 27 and 28 are respectively an elevation and a section of one of the spiders of the drum.

The reference-numeral 1 designates a furnace, the general construction of which may be of any suitable or preferred form, lined with fire-brick, as shown at 2 in Fig. 1, and having a pipe 3 connected with its top for the escape of the products of combustion and the passage of hot air, said pipe being connected, as will be described hereinafter, with the roasting-drum, the cooler, and an exhaust fan or blower.

4 designates the casing of the roaster, which is of circular or cylindrical form and provided with a closed cover 5 and a funnel-shaped bottom 6, the latter being provided with a discharge-opening communicating with a cooling-receptacle, comprising a closed pan 7, supported below the casing 4 upon suitable supports.

Within the casing 4 is arranged a revoluble drum 8, of the double conical form shown in Fig. 3. The ends of the drum 8 are carried by spiders 9 and 10, formed with hubs 11, and annular inclined flanges 12, to which the ends of the drum are bolted.

A hopper 13 is arranged at one side of the casing 4 to communicate with the adjacent end of the drum, the admission of the material to the drum through said hopper being controlled by a gate-valve 14.

A shaft 15, supported in bearings of a suitable frame and provided with a sprocket-wheel 16, extends through the hub of the spider 9. The end of this shaft 15, within the spider, is hollowed out to receive one end of a shaft 17, the opposite end of which is supported within a sleeve or hollow shaft 18, supported in the hub of the spider 10 and extending beyond the front wall of the casing. The casing is supported upon suitable legs or brackets 19. Upon the shaft 17 is secured by set-screws 20 a casting 21, bored for the passage of the shaft and having radial threaded sockets 22 for the reception of the inner ends of rods 23, to the outer ends of which are secured gates 24, held between clamping-nuts 25, as shown in Fig. 3, and adapted to slide within guideways 25ª, formed in the drum.

26 designates an angle deflecting-plate secured one to each of the rods 23, and from the inner surface of the drum plates or vanes 27 project. These plates or vanes 26 and 27 serve to direct the coffee toward the center and front of the drum and to stir the coffee to insure an even and thorough heating thereof.

28 designates a shaft supported at its lower end in a socket-bearing 29 and extending up within the cooler 7 and through a bearing 30, secured centrally to the bottom of the cooler. Below the cooler the shaft 28 is provided with a bevel gear-wheel 31, meshing with a bevel-gear 32, mounted upon the end of a horizontal shaft 33, adapted to be driven by means of a sprocket-wheel 34, alined with a sprocket-wheel 35 on the shaft 15, concentric with the sprocket 16 on said shaft.

36 designates a fan-casing supported by suitable framework and having bearings for a shaft 37, carrying a fan, (not shown,) and a pulley 38, adapted to be connected by a belt with a pulley 39 on a shaft 40, which constitutes the main power-shaft of the machine. The sprocket 16 is also connected by a belt with a sprocket 41 on the shaft 40, so that the revolution of the drum is effected from the main shaft 40.

The shaft 15 is provided with a clutch device 42, by means of which the revolution of the stirrers in the cooler may be stopped and started at will.

The connections between the furnace and the drum, the blower, and the cooler will now be described.

The pipe 3 is provided adjacent to the furnace with a gate-valve 43, which controls the passage of hot air to the drum. This pipe 3 is connected at the point 44 with a casting 45, secured to the casing 4, and the hot air from the furnace is conducted through said casting 45 to the drum. After passing through the drum the hot air passes out through a casting 46 at the opposite side of the casing and passes thence through a pipe 47 to the fan-casing 37. The pipe 3 is connected in front of the gate-valve 43 by means of a branch pipe 48, with the pipe 47 leading to the exhauster 37, said pipe 48 being provided with a valve or gate 49 for shutting off the draft to the exhauster.

50 designates a pipe connecting the cooler with the pipe 47, between the point where the pipe 48 enters the pipe 47, and the fan-casing 37. The pipe 50 is provided with a gate-valve 51, by means of which communication between the cooler and exhauster is opened and closed. A gate 52 is also located in the pipe 47, between the pipe 48 and the casting 46.

I will now describe my improved means for discharging the coffee from the revolving drum while the machine is in motion. Upon the outer end of the shaft 17 is mounted a hand-wheel 60, provided with an opening through which extends a spring-pressed locking-pin 61, adapted to project into an opening 62 in a disk 63, carried by the hollow shaft 17, so that the hand-wheel and shaft 17 will revolve with the drum. By pulling out the pin 61 by its knob 64 and holding the wheel 60 and shaft 17 against rotation the drum and the four rods 23 will be held stationary, thus opening all four of the gates 24 and allowing the contents of the drum to escape quickly into the casing and fall through the discharge-opening therein into the cooler. The gates 24 may be closed again by giving the hand-wheel 60 a quick movement in the direction of revolution of the drum, causing the pin 61 to again spring into the opening 62 of the disk 63. The casting 46, which supports the hopper, is provided with an opening 65 to permit of access to the drum to test or try the contents thereof.

The operation of the apparatus is as follows: After the fire is started in the furnace the gate-valve 43 in the pipe 3 and the gate 52 in the pipe 47 are closed and the gate 49 in the pipe 48 is opened, thus allowing the products of combustion to pass directly to the suction-fan or exhauster. After the smoke, gases, &c., have been drawn off and a clear bright fire is obtained the gate 49, leading to the exhauster, is closed and the gates 43 and 52 are opened, permitting the hot air to pass from the pipe 3 through the casting 45 and into the drum, and thence out through the casting 46 and pipe 47 to the exhauster, a steady and continuous draft being maintained by the exhauster through the drum. After the roasting has continued for a sufficient length of time the gates 43 and 52 are all closed and the roasting is allowed to continue by the heat within the drum until the coffee is thoroughly roasted and ready for cooling. The gate 49 may be left partially open to maintain a slight draft from the furnace to the exhauster while the fire is being replenished. The discharge-gates of the drum are then opened by the hand-wheel 60, as above described, to deliver the coffee to the cooler. Meanwhile, if so desired, the furnace has been recharged and the gate-valve 49 opened to allow the exhauster to draw off the undesirable products of combustion and make ready for another roasting operation. After the coffee is delivered to the cooler the gate 51 in the pipe 50 is opened, thus connecting the cooler with the fan to create a draft therethrough, the cool air being drawn into the cooler and passing up the pipe 50 to the exhauster.

I may employ any preferred or suitable means for opening and closing the various valves, the means here shown consisting of levers 75, fulcrumed on arms or brackets 66, projecting from the floor on suitable supports and provided with depending handles 67.

I preferably secure the revolving drum to the spiders 9 and 10 adjustably to compensate for expansion and contraction, and also secure the casting 46, to which the hopper is secured, adjustably, so that it may be adjusted with relation to the adjustment of the drum.

The cooler is provided with means for stirring its contents, comprising radial arms 68, secured in sockets of a casting 69, secured upon the shaft 28. Upon the arms 68 are arranged oscillating blocks 70, connected by a frame 71, to which weights 72 are secured. Each of the blocks 70 carries an adjustable plate or blade 74, adapted to be raised and lowered by the tilting of the frame. The tilting movement of the frame and stirrers is limited by stops 73, secured on the arms 68.

I claim—

1. A roasting-machine comprising a revoluble drum, a furnace arranged adjacent thereto, an air-pump, a valved connection between the furnace and one end of the drum, a valved connection between the other end of the drum and the exhauster, means for closing the valve in either of said connections and opening the valve in the other, and means for directing the hot air and products of combustion to the air-pump instead of to the drum, substantially as described.

2. A roasting-machine comprising a revoluble drum; a cooler below said drum; a furnace connected with said drum for heating the interior thereof; a suction device communicating with the furnace, drum and cooler, and means for closing the communication between the suction device and either the furnace, drum or cooler at will, substantially as described.

3. A roasting-machine comprising a furnace, a casing provided with a hopper, a revoluble drum rotatably arranged within the casing, an exhaust-fan, a pipe connection between the furnace and the drum, a branch pipe leading from the said pipe connection to the exhaust-fan, a valve in the branch pipe, a valve in the pipe connection between the branch pipe and the drum, a valved pipe connection between the drum and the exhaust-fan, and means for operating said valves, whereby the hot air and products of combustion may be withdrawn by the fan from the furnace through the drum, or directly from the furnace, substantially as described.

4. In a coffee-roasting machine, the combination with a revoluble drum, of a cooler into which the contents of the drum are discharged, a rotary stirrer for stirring the coffee within the cooler, an exhaust-fan common to both the drum and cooler, and means for shutting off the communication between the exhaust-fan and either the drum or cooler at will, substantially as described.

5. In a coffee-roasting machine, the combination with a revoluble drum, of a cooler arranged below the drum; a sieve within the cooler, adjustable oscillatory blades for stirring the coffee within the cooler, and discharging the contents of the cooler automatically, weights for holding the blades in their normal position, and stops for limiting the oscillatory movement of the blades, substantially as described.

6. In a coffee-roasting machine, the combination with a furnace, of a revoluble drum, an exhaust-fan, a pipe leading from the furnace to the drum, a pipe leading from the drum to the blower, a branch pipe connecting said pipes between the furnace and drum, and valves arranged in said pipes and branch pipe, substantially as described and for the purpose specified.

7. In a roasting-machine, the combination with a revoluble drum arranged to rotate loosely about a central shaft, radial arms carried by said shaft, segmental gates arranged on the ends of said arms and normally closing discharge-openings in the drum, means for causing the shaft to rotate in unison with the drum, and means for arresting the rotation of the shaft while the drum is rotating to open the gates, substantially as described.

8. In a roasting-machine, the combination with a revoluble drum and a cooler, of revoluble stirrer-arms within the cooler, and weighted stirrers loosely sleeved on the stirrer-arms and arranged to stir and automatically discharge the contents of the cooler, substantially as described.

In testimony whereof I have affixed my signature in presence of two witnesses.

RUDOLPH W. KOCH.

Witnesses:
  FRANK D. BLACKISTONE,
  ALBERT POPKINS.